United States Patent [19]
Lesk et al.

[11] 3,811,248
[45] May 21, 1974

[54] APPARATUS FOR REVERSING THE CONVEYING-AIR IN PNEUMATIC SUCTION-CONVEYING INSTALLATIONS

[75] Inventors: Adolf Lesk, Osterburken; Rudolf Baumann, Rosenberg; Otmar Link, Osterburken, all of Germany

[73] Assignee: Adolf Zimmermann Maschinenbau, Osterburken, Germany

[22] Filed: Apr. 7, 1972

[21] Appl. No.: 242,075

[30] Foreign Application Priority Data
Apr. 24, 1971 Germany............................ 2120189
Apr. 24, 1971 Germany............................ 7115943

[52] U.S. Cl. ............... 55/272, 55/283, 55/302, 137/609
[51] Int. Cl. ............... B01d 19/00, F16k 11/00
[58] Field of Search ...... 137/609, 610; 55/272, 283, 55/302

[56] References Cited
UNITED STATES PATENTS

| | | |
|---|---|---|
| 3,089,515 | 5/1963 | Bochan ............................ 137/610 |
| 3,132,669 | 5/1964 | Feldsted ........................ 251/347 X |
| 3,174,806 | 3/1965 | Barber et al. .................... 137/610 X |
| 3,395,731 | 8/1968 | Kauffman ........................... 137/610 |
| 2,998,828 | 9/1961 | Hare ......................... 137/625.48 X |
| 3,463,193 | 8/1969 | Yost .......................... 137/625.48 X |
| 3,545,474 | 12/1970 | Brown ............................... 137/610 |
| 3,581,768 | 6/1971 | Conti ................................ 137/610 |
| 3,682,575 | 8/1972 | Guddal et al. ............. 137/625.48 X |

Primary Examiner—Alan Cohan
Assistant Examiner—Ira S. Lazarus
Attorney, Agent, or Firm—Craig & Antonelli

[57] ABSTRACT

Pneumatic suction-conveying installations for reversing the air flowing through a separator for the conveyed material, in which a hose switch is arranged between a conduit leading from the separator to the blower providing the suction effect and a suction union and delivery union of the blower.

7 Claims, 5 Drawing Figures

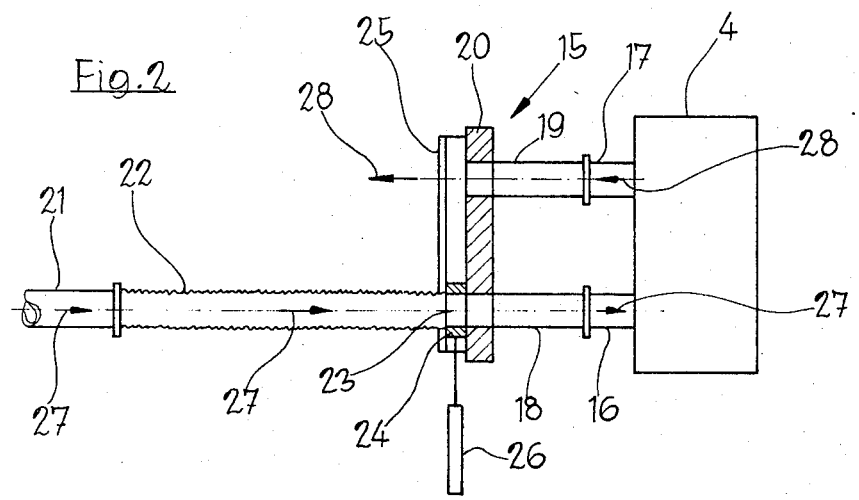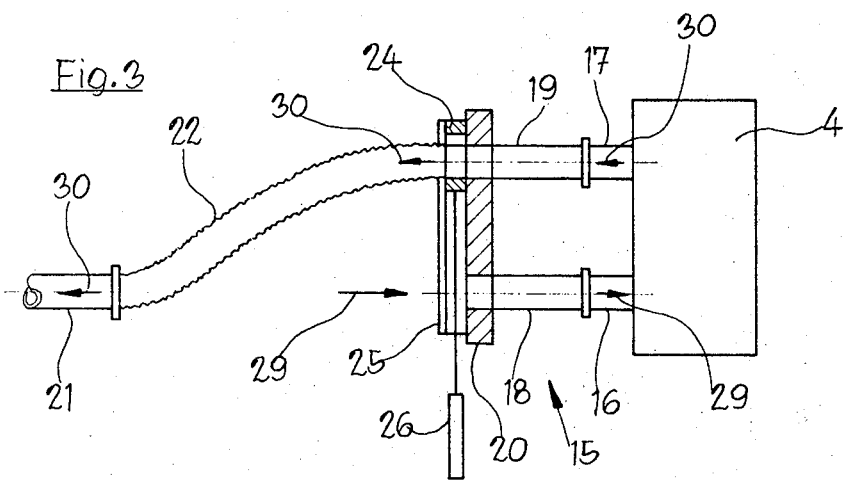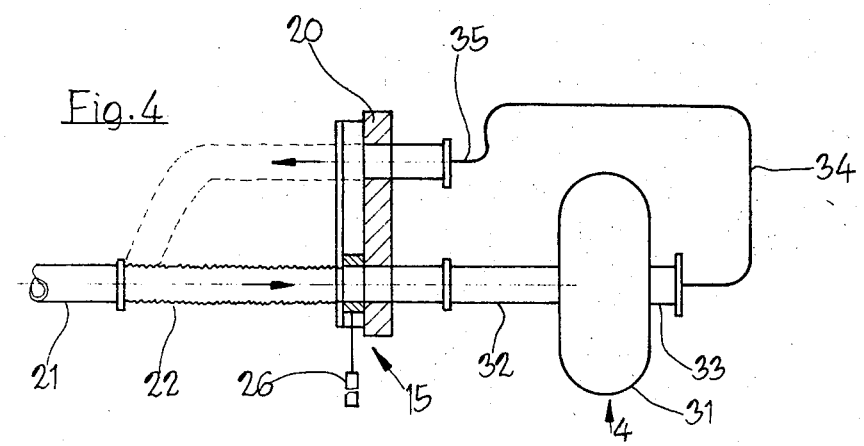

APPARATUS FOR REVERSING THE CONVEYING-AIR IN PNEUMATIC SUCTION-CONVEYING INSTALLATIONS

The present invention relates to an apparatus in pneumatic suction-conveying installations, for reversing the direction of the air flowing through a separator for the conveyed material.

Such suction-conveying installations are used for transporting bulk materials over relatively considerable distances, for example from a storage bin to the place of use. In contrast to pressure-conveying installations, the bulk material is transported through the conduits of the installation by means of a suction air flow. At the end of the path of conveyance the conveying air is drawn through filter batteries in the form of filter bags, hoses or the like, the material settling on the outside of the filter surface whereas the air freed from the conveyed material passes into the free atmosphere through the blower which produces the suction effect. The deposit is detached from the filters at intervals of time mechanically or pneumatically, so that the bulk material is collected in the separator container surrounding the filters and can be removed in any way therefrom.

Since the installation is subjected to vacuum, this must be eliminated in order to remove such material. Thus, either air may be introduced into the entire installation, or it is possible to wait until the vacuum collapses by the intrusion of air from the outside. This is time-consuming and therefore is not suitable for a rational working procedure.

For this reason, the vacuum is generally eliminated by using a reversing motor to drive the blower, so that the blower is made to operate in the reverse direction by pole-changing or switching-over. The blower sucks air from the environment and forces it into the separator. Of course, this reversal of the direction of rotation is only possible with certain blowers, more particularly those of a rotary piston type. With considerable driving power values such as are often required in conveying installations, this pole-changing or switching-over involves a considerable and, therefore, expensive constructional outlay. Finally, the fact that changing-over must be effected at short intervals of time of one or more minutes results in considerable switching times which correspondingly load the driving motor, so that correspondingly expensive motors have also to be used. Since the motor has to be brought from its operating speed for suction through zero speed to the operating speed for forcing air into the separator, fairly considerable amounts of time are lost in supplying air to the installation.

The invention has as its object to provide a constructionally simple and operationally reliable apparatus for changing the direction of flow of the air passing through the separator for the conveyed material, which apparatus is to operate with a minimum loss of time when air is to be supplied into the installation.

This object is achieved according to the invention in that a so-called "hose switch" is arranged between, on the one hand, the conduit leading from the separator to the blower and on, the other hand, the suction and delivery unions of the blower.

With the help of a per se known hose switch, the invention solves an existing problem in a simple and striking manner, since it is possible by simply changing the hose switch from the suction to the delivery union to pass the delivery pressure of the blower into the installation instead of the suction effect. Thus, it is not necessary to reverse the direction in which the motor runs or to provide any additional devices. On the contrary, the motor always runs at its operating speed and the blower always runs in the same direction.

The suction and delivery unions of the blower are brought into parallel positions relatively to one another, and comprise a common end flange opposite which the hose, forming a conduit section, is guided to be displaceable between positions in alignment with the suction and delivery unions respectively. Bringing suction and delivery unions into parallel positions is necessary for example in the case of rotary piston blowers since these blowers comprise suction and delivery unions which are normally situated diametrally opposite one another. If, on the other hand, a blower is used in which the suction and delivery unions are situated parallel in any case, there is of course no need for any additional means for providing a parallel arrangement.

The drive of the hose switch for displacing the hose section to and fro may be time-controlled in order to permit material to be taken from the separator at specific intervals of time. To remove the hose from a union and apply it in sealing-tight manner to the other union, according to the invention a single drive is used, a device being provided which guides the hose both axially and also in the direction of displacement.

Further features, details and advantages of the invention will be apparent from the description of a preferred constructional form which is shown, by way of example, in the accompanying drawings, wherein:

FIG. 2 shows a diagrammatic view, partly in section, of the blower and the hose switch in the operating position;

FIG. 3 shows a view similar to FIG. 2 in the position wherein air is delivered into the installation;

FIG. 4 shows a further constructional form of the hose switch for a blower wherein the suction and delivery unions are not parallel.

Figure 1:
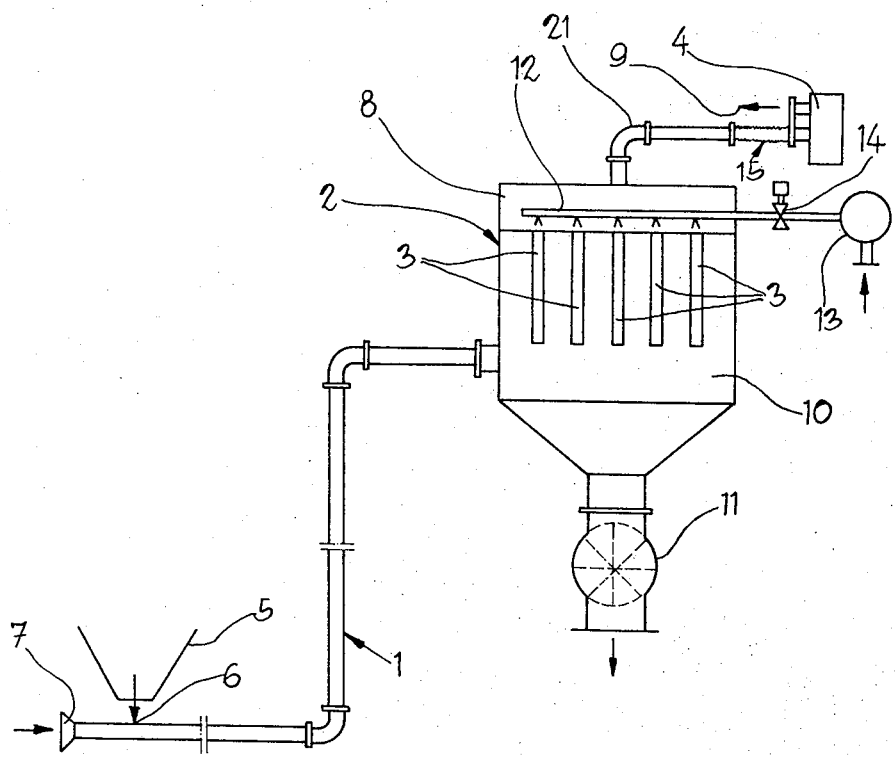
FIG. 1 shows a diagrammatic general view of a pneumatic conveying installation.

The pneumatic conveying installation includes as its main component parts a pipeline arrangement 1, a separator 2 with filters 3 inserted therein, and a blower 4 for producing a suction effect. The blower 4 draws air into the pipeline arrangement 1 at the position 7. At the position 6 the material to be conveyed is introduced from a storage bin 5, for example, into the pipeline and conveyed by the suction flow into the separator 2. In the separator the material accumulates on the outside of the filters 3, whereas the conveying air passes in a clean condition into a clean gas chamber 8 and is blown out in the direction of the arrow 9 by the blower 4.

The material which accumulates on the filters 3 falls into the chamber 10 of the separator 8 and can be removed by way of a bucket wheel valve 11 or the like. To detach the filter layers and clean the filters a cleaning air conduit 12 is provided by means of which a counter-pressure is applied against the filters 3 from a pressure vessel 13 by way of a magnetically-operated valve 14.

In front of the blower 4 there is shown a hose switch which is given the general reference numeral 15 and which is shown in more detail in FIGS. 2 and 3. The blower 4 comprises a suction union 16 and a delivery union 17. These unions in the constructional form shown in FIGS. 2 and 3 are situated parallel to one another and they are prolonged by further sections 18, 19 of piping which are connected to one another by a common end flange 20.

A conduit 21 leading from the separator to the blower comprises a hose section 22 which at its mouth 23 is adapted to be displaced to and from between the suction and delivery unions 16 and 17 of the blower 4. For this purpose, a flange 24 surrounding the mouth 23 is guided for example in a rail 25 secured to the end flange 20. A drive 26 for example a jack or actuator, which may be time controlled, displaces the flange 24 of the hose section 22 between the suction union 16 and the delivery union 17 of the blower 4.

In the operating position shown in FIG. 2 the air contained in the system is aspirated in the direction of the arrows 27 and blown into the free atmosphere in the direction of the arrows 28. In the air supply position shown in FIG. 3, wherein the hose section 22 has been moved to a position in front of the delivery union 17 of the blower, the blower 4 draws air from the environment in the direction of the arrows 29 and forces the air in the direction of the arrows 30 into the conveying installation, so that the vacuum therein is eliminated and replaced by a slight positive pressure which is sufficient to open the separator and remove the material therefrom.

FIG. 4 shows a construction wherein the blower 4 is a rotary piston blower 31 for example. In these blowers a suction union 32 and a delivery union 33 are usually situated opposite one another. In order to enable a hose switch of the type used in FIGS. 2 and 3 to be used in this case also to the delivery union 33 a conduit 34 is connected which terminates at 35 parallel with the suction union 32. A hose switch 15, similar to that shown in FIGS. 2 and 3, is again arranged in front of the suction union 32 and the parallel delivery union end 35.

Figure 5:
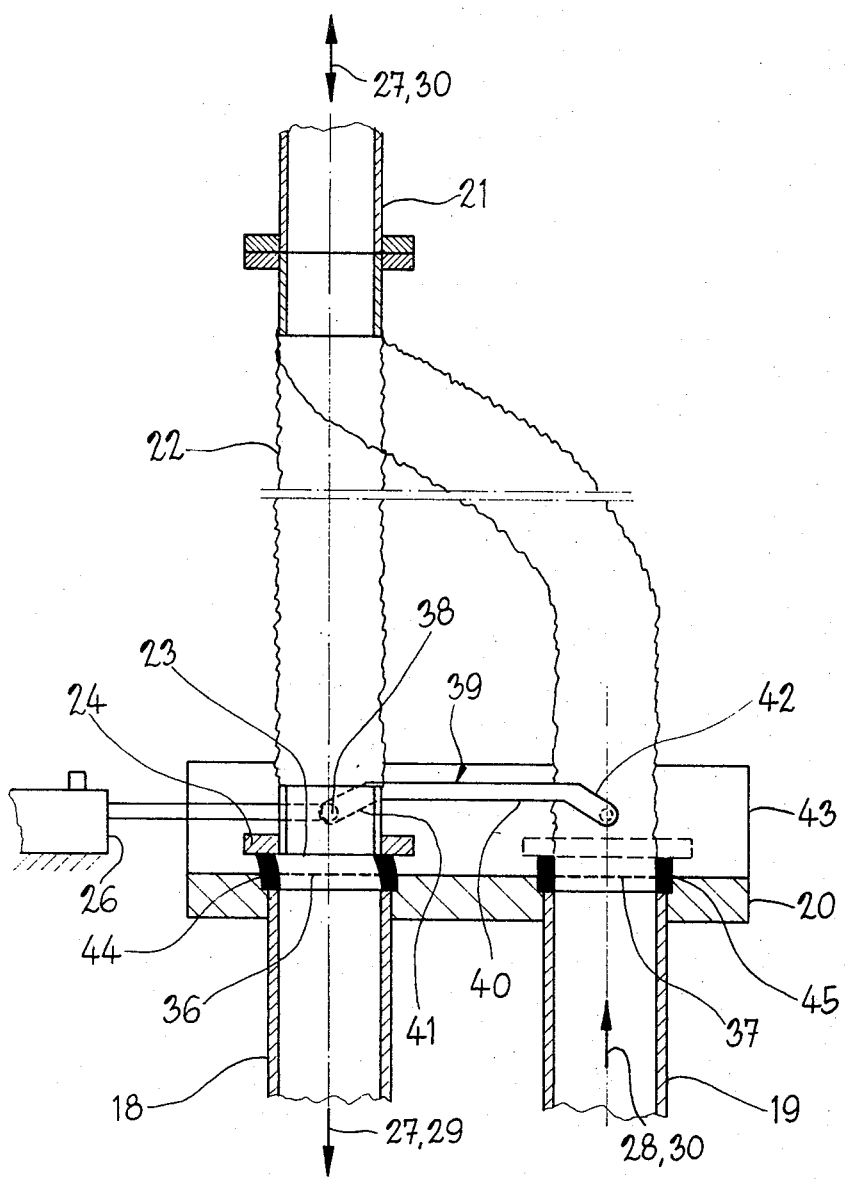
FIG. 5 shows a view on a larger scale and partly in section of one constructional form for the drive of the hose switch.

FIG. 5 shows a preferred constructional form for driving the hose switch. Two parallel sections of piping 18 and 19 are secured to the common flange plate 20. The mouths 36, 37 of the pipes are thus situated in the same plane. The hose 21 may be connected at its mouth 23 and at its end comprises the flange 24 which is capable of being displaced by means of the jack 26 transversely to the mouths 36, 37.

At its rear side remote from the plane of the drawing, there is a guide pin 38 which slides in a guide slot 39. The guide slot 39 comprises a portion 40 arranged parallel to the plane of the mouths and portions 41, 42 which adjoin the first-mentioned portion at both ends thereof and are inclined towards the mouths 36 and 37 respectively. When the hose switch is to be moved from the position shown in full lines in FIG. 5 into the position shown in broken lines, the jack 26 is operated and this shifts the guide pin 38 first in the ascending portion 41 of the guide slot 39 and then into the horizontal portion 40 and finally moves it along the descending portion 42. This movement first lifts the flange 24 away from the mouth 36 then moves it horizontally and finally applies it with a sealing-tight effect against the other mouth 37.

The guide slot 39 may be formed in a plate 43 arranged on the flange 20. Furthermore, the jack 26 may either be mounted pivotally or may act at its end on the guide pins 38 by means of a push crank.

A satisfactory seal is obtained if the mouths 36, 37 or the mouth 23 of the hose 22 are provided with a sealing element which projects above the plane of the mouth. In the construction shown in FIG. 5, the sealing elements 44, 45 are inserted on edge in the flange 20, so that they are deformed radially when the hose flange 24 is applied obliquely, as is shown at the left-hand position.

We claim:

1. A pneumatic suction conveying installation having a separator means for separating conveyed material and a blower means for providing suction through the separator means, comprising: a conduit means for interconnecting said blower means and said separator means including a hose portion, a suction union and a delivery union provided on said blower means, means for positioning said suction union and said delivery union into a position parallel to one another, a common end flange means provided on said means for positioning, and a hose switch means disposed between said hose portion and said common end flange means, said hose switch means being selectively displaceable to align with at least one of said suction union or said delivery union of said blower means to selectively reverse the air flowing through the separator, and means for guiding said hose portion axially and in the direction of displacement simultaneously, and means for selectively producing this movement, said guiding means including a guide and a guide element arranged on said hose portion adapted to engage in said guide, said guide including a portion which is arranged between the adjacently-disposed mouths of said suction and said delivery unions parallel to the plane in which the mouths are situated, and portions which adjoin the first-mentioned portion at both ends and are inclined towards the respective mouth in each case.

2. Apparatus as claimed in claim 1, wherein said guide consists of a guide slot and said guide element arranged on the hose consists of a pin engaging in said guide slot.

3. Apparatus as claimed in claim 2, wherein the mouths of at least one of the suction and delivery unions or the mouth of the hose is surrounded by a sealing element, said sealing element being capable of being deformed radially and projecting above the plane of the mouth.

4. A pneumatic suction conveying installation having a separator means for separating conveyed material and a blower means for providing suction through the separator means, comprising: a conduit means for interconnecting said blower means and said separator means including a hose portion, a suction union and a delivery union provided on said blower means, means for positioning said suction union and said delivery union into a position parallel to one another, and means for reversing the air flow through the separator including a common guide means provided on said means for positioning, a hose switch means disposed between said hose portion and said common guide means, and means connected to said hose switch means for selectively displacing said hose switch means to align said hose switch means with at least one of said suction union or said delivery union of said blower means to selectively reverse the air flowing through the separator.

5. Apparatus as claimed in claim 4, wherein said means for displacing said hose switch means includes time controlled means for selectively displacing said hose switch to at least one of said suction union or said delivery union.

6. Apparatus as claimed in claim 4, wherein said guide means includes means for guiding said hose portion axially and in the direction of displacement simultaneously, and means for selectively producing this movement.

7. Apparatus as claimed in claim 6, wherein said guiding means includes a guide and a guide element being arranged on said hose portion adapted to engage in said guide.

* * * * *